(12) United States Patent
Hamilton

(10) Patent No.: US 7,096,349 B1
(45) Date of Patent: Aug. 22, 2006

(54) FIRMWARE ALGORITHM FOR INITIALIZING MEMORY MODULES FOR OPTIMUM PERFORMANCE

(75) Inventor: Thomas H. Hamilton, Manor, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 535 days.

(21) Appl. No.: 10/320,085

(22) Filed: Dec. 16, 2002

(51) Int. Cl.
*G06F 15/177* (2006.01)
(52) U.S. Cl. ............................. 713/1; 711/167
(58) Field of Classification Search .............. 713/1, 713/2; 711/167
See application file for complete search history.

(56) References Cited

U.S. PATENT DOCUMENTS

| 5,418,924 | A | | 5/1995 | Dresser |
| 6,088,774 | A | * | 7/2000 | Gillingham ............... 711/167 |
| 6,334,174 | B1 | * | 12/2001 | Delp et al. ................. 711/167 |
| 6,453,434 | B1 | * | 9/2002 | Delp et al. ................. 714/718 |
| 6,553,472 | B1 | * | 4/2003 | Yang et al. ................ 711/167 |
| 6,854,043 | B1 | * | 2/2005 | Hargis et al. .............. 711/168 |
| 2001/0003198 | A1 | * | 6/2001 | Wu .............................. 711/104 |
| 2002/0144173 | A1 | * | 10/2002 | Jeddeloh .................... 713/501 |
| 2003/0188083 | A1 | * | 10/2003 | Kumar et al. .............. 710/315 |
| 2004/0088472 | A1 | * | 5/2004 | Nystuen et al. ............ 711/5 |

FOREIGN PATENT DOCUMENTS

JP    6-202934    *    7/1994

OTHER PUBLICATIONS

JEDEC Solid State Technology Association "Double Data Rate (DDR) SDRAM Specification", Release 2, May 2002, pp. 1-75.

* cited by examiner

*Primary Examiner*—Chun Cao
(74) *Attorney, Agent, or Firm*—Zagorin O'Brien Graham LLP

(57) ABSTRACT

A technique for initializing a memory controller of a plurality of memory modules for optimum system performance is presented. A plurality of optimum sets of operational parameters that are supported by the memory controller and the plurality of memory modules are determined. A plurality of benchmark calculations using the plurality of optimum sets of operational parameters produces a plurality of benchmark numbers. The memory controller is configured with the one of the plurality of optimum sets of operational parameters that produces the best of the plurality of benchmark numbers. The benchmark calculations can be based on a variety of conditions, for example, burst length or the minimum time to read a random row of memory. Additionally, the benchmark calculations can be weighted in favor of frequency.

46 Claims, 14 Drawing Sheets

```
void FindOptimalT()
{
      //This algorithm finds the best T and associated CL of given DIMMs.
      //This algorithm favors better T at the expense of CL (when more than
      //one combination is available).
      int Tmin,CLmin,flag;
      int i,j,k;                    //enumeration of DIMM #, CL, and T
      Tmin=T_MAX;CLmin=CL_MAX;
      flag=0;

for(k=T_MIN;k<=T_MAX &&!flag;k++)
      {
            for(j=CL_MIN;j<=CL_MAX && !flag;j++)
            {
// First, check to see if Memory Controller supports current CL and T combo.
                  if(ValMCTSystem(j,k))
                  {
                        // Then check to see if all DIMMs support this combo
                        for(i=0;i<DIMMs_MAX;i++)
                        {
                              if(DIMM_Present(i) && !ValidateDimm(i,j,k))break;
                        }// Next DIMM
                        if(i==DIMMs_MAX)
                        {
// New best case combo found that MCT and all DIMMs support.
                              Tmin=k;
                              CLmin=j;
                              flag=1;
                        }
                  }
            }// Next CL
      }// Next freq.
}
```

FIG. 8A

```
void FindOptimalT_alternate()
{
//This algorithm differs from FindOptimalT() in that it cycles through only
//combinations that are available on the first DIMM, thereby saving time.
//This algorithm finds the best T and associated CL of the given DIMMs.
//This algorithm favors better T at the expense of CL (when more than one
//combination is available).
        int Tmin,CLmin,flag;
        int i,j,k,m;                    //enumeration of DIMM #, CL, and T
        int T_MIN;
        int T_MAX;
        int CL_MIN;
        int CL_MAX;
        Tmin=T_MAX;CLmin=CL_MAX;
        flag=0;
        for(i=0;i<DIMMs_MAX;i++)
                if(TestDimm(i))break;    //set i to first populated DIMM
        T_MIN=TminparamDimm(i);
        T_MAX=TmaxparamDimm(i);
        CL_MIN=CLminparamDimm(i);
        CL_MAX=CLminparamDimm(i);

for(k=T_MIN;k<=T_MAX &&!flag;k++)
        {
                for(j=CL_MIN;j<=CL_MAX && !flag;j++)
                {
// First, check to see if Memory Controller supports current CL and T combo.
                        if(ValMCTSystem(j,k))
                        {
// Then check to see if rest of all DIMMs support this combo
                                for(m=i+1;m<DIMMs_MAX;m++)
                                {
                                    if(DIMM_Present(m) && !ValidateDimm(m,j,k))break;
                                }// Next DIMM
                                if(m==DIMMs_MAX)
                                {
// New best case combo found that MCT and all DIMMs support.
                                        Tmin=k;
                                        CLmin=j;
                                        flag=1;
                                }
                        }
                }// Next CL
        }// Next freq.
}
```

FIG. 8B

```
void FindOptimalCL()
{
//This algorithm finds the best CL and associated T of the given DIMMs.
//This algorithm favors better CL at the expense of T (when more than one
//combination is available).
        int Tmin,CLmin,flag;
        int i,j,k;                      //enumeration of DIMM #, CL, and T
        Tmin=T_MAX;CLmin=CL_MAX;
        flag=0;

for(j=CL_MIN;j<=CL_MAX && !flag;j++)
        {
                for(k=T_MIN;k<=T_MAX &&!flag;k++)
                {
// First, check to see if Memory Controller supports current CL and T combo.
                        if(ValMCTSystem(j,k))
                        {
                                // Then check to see if all DIMMs support this combo
                                for(i=0;i<DIMMs_MAX;i++)
                                {
                                    if(DIMM_Present(i) && !ValidateDimm(i,j,k))break;
                                }// Next DIMM
                                if(i==DIMMs_MAX)
                                {
                        // New best case combo found that MCT and all DIMMs support.
                                        Tmin=k;
                                        CLmin=j;
                                        flag=1;
                                }
                        }
                }// Next freq.
        }// Next CL
}
```

FIG. 8C

```
(int,int) FindOptimalCLT()
{
//This algorithm finds the best CL and T of the given DIMMs as expressed
//mathematically by a supplied synthetic benchmark.
//1.   Find the best CL/T favoring T
//2.   Find the best CL/T favoring CL
//3.   Compute the benchmark using the number combination found in step 1.
//4.   Compute the benchmark using the number combination found in step 2.
//5.   Compare the benchmark values to determine which set of T/CL is best.

float BenchMark1,BenchMark2;
      int    Type,BurstLength;
      int  T1min,CL1min,flag;
      int  T2min,CL2min;
      int  i,j,k;                        //enumeration of DIMM #, CL, and T
      T1min=T_MAX;CL1min=CL_MAX;
      flag=0;
      for(k=T_MIN;k<=T_MAX &&!flag;k++)
      {
            for(j=CL_MIN;j<=CL_MAX && !flag;j++)
            {
// First, check to see if Memory Controller supports CL and T combo.
                if(ValMCTSystem(j,k))
                {
                  // Then check to see if all DIMMs support this combo
                        for(i=0;i<DIMMs_MAX;i++)
                        {
                          if(DIMM_Present(i) && !ValidateDimm(i,j,k))break;
                        }// Next DIMM
                        if(i==DIMMs_MAX)
                        {
            // New best case combo found that MCT and all DIMMs support.
                                T1min=k;
                                CL1min=j;
                                flag=1;
                        }
                }
            }// Next CL
      }// Next freq
```

FIG. 8D

```
        T2min=T_MAX;CL2min=CL_MAX;
        flag=0;

for(j=CL_MIN;j<=CL_MAX && !flag;j++)
        {
                for(k=T_MIN;k<=T_MAX &&!flag;k++)
                {
// First, check to see if Memory Controller supports CL and T combo.
                        if(ValMCTSystem(j,k))
                        {
                        // Then check to see if all DIMMs support this combo
                                for(i=0;i<DIMMs_MAX;i++)
                                {
                                if(DIMM_Present(i) && !ValidateDimm(i,j,k))break;
                                }// Next DIMM
                                if(i==DIMMs_MAX)
                                {
        // New best case combo found that MCT and all DIMMs support.
                                        T2min=k;
                                        CL2min=j;
                                        flag=1;
                                }
                        }
                }// Next freq.
        }// Next CL BenchMark1=SyntheticBenchMark(T1min,CL1min,Type,BurstLength);
        BenchMark2=SyntheticBenchMark(T2min,CL2min,Type,BurstLength);

if(BenchMark1 < BenchMark2) return(T1min,CL1min);
        else return (T2min,CL2min);

```
float SyntheticBenchMark(int T, int CL, int Type, int BurstLength)
{
//This routine computes a number that relates to real world performance,
//using the function dependent on T and CL DDR timing parameters:
//B=(CL+Beta)*T
// This a benchmark is based on a blend of frequency and CAS latency.
// It indicates good random read performance, as well as overall performance
// if either no consecutive read bursts are used, or if the delta between
// available CL is one or greater between one speed grade on registered
// modules.
//Lower is better
//
//This benchmark formula is just an example.  Any formula could be used
//to determine what is the best.
//Type=0 is Unbuffered DDR
//Type=1 is Registered DDR float Beta;
        float Bench;

if(Type==0 || Type=1)Module_Type=Type;
        else Module_Type=0;

Beta=BurstLength/2+Module_Type;         // a constant

Bench=(CL+Beta)*T;
        return(Bench);
}
```

FIG. 8F

```
float SyntheticBenchMark_alternate(int T, int CL, int Type, int BurstLength)
{
        //The formula is much simplified so that if the algorithm in
        //FindOptimalCLT is used then the final answer will be the same as
        //the best T/CL combo which favors T.
        return(T);
}

//   OEM supplied functions
/******************************************/
//     TestDimm
//           Check to see if the DIMM slot is populated
//     Returns: boolean T/F
int DIMM_Present(int DimmNumber)
{
        // Attempt a SPD read, if fails then return false
}

/******************************************/
//     ValidateDimm
//           Check if this DIMM will support the supplied combination
//     Returns: boolean T/F
int    ValidateDimm(int DimmNumber, int CASLatency, int CycleTime)
{
        // Read whatever SPD values needed
        // Check to see if DIMM will support combination
        // If DIMM can suport combination then return true, else false
}
/******************************************/
//     ValMCTSystem
//           Check to see if the platform and the current processing node
//           supports the requested speed and CAS Latency.
//     Returns: boolean T/F
int ValMCTSystem(int CASLatency, int CycleTime)
{
        // Query Capabilities of the Memory Controller
        // to see if it supports the given combination.
        // Insert OEM defined frequency limit if desired.
}
```

FIG. 8G

FIRMWARE ALGORITHM FOR INITIALIZING MEMORY MODULES FOR OPTIMUM PERFORMANCE

CROSS-REFERENCE TO RELATED APPLICATION(S)

BACKGROUND

1. Field of the Invention

This invention relates to computing system initialization and more particularly to memory parameter configuration of a memory controller for optimum performance.

2. Description of the Related Art

Computing systems are information handling systems which are designed to give independent computing power to one or more users. Computing systems can be found in many forms including, for example, mainframes, minicomputers, workstations, servers, personal computers, internet terminals, notebooks and embedded systems. Personal computer (PC) systems include desk top, floor standing, or portable versions. A typical PC system is a microcomputer that includes a microprocessor, associated memory and control logic (typically on a system board) and a number of peripheral devices that provide input and/or output (I/O) for the system. PC system boards often receive expansion printed circuit boards (PCBs) to increase the capabilities of the computer system and to connect to peripheral devices through an expansion bus. For example, various multimedia devices are commonly implemented as add-in cards in desktop and portable computers or as integrated circuits for installation on a system board.

Computing systems typically include a set of built-in software routines called the basic input/output system (BIOS). The BIOS is a software interface between the system hardware and the operating system software. The BIOS facilitates programmer and user interaction with the system hardware. Because the BIOS has qualities of software and hardware, it is often referred to as firmware. The BIOS is a set of instructions to the computer's microprocessor. The BIOS is commonly coded using, for example, assembly language, and stored onto a non-volatile memory such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS.

The BIOS controls several important functions of personal computer systems. For instance, the BIOS performs various functions at power up, including testing and initializing memory, inventorying and initializing the system, and testing the system. These functions at power up are referred to as "system boot" or "booting the system" and can occur every time the system powers up or is reset. The BIOS also controls keystroke interpretation, display of characters, and communication via the PC ports. The operating system and application programs of a computer system can access the BIOS rather than directly manipulating I/O ports, registers and control words of the specific system hardware. BIOS can be accessed through an interface of software interrupts and contains a plurality of entry points respectively corresponding to the different interrupts.

Computing systems have memory arranged in arrays that can include multiple memory modules. Each memory module can have a wide operational parameter envelope. Many computing systems hard wire operational speeds and other parameters of the memory modules. For example, the operational frequency, read/write (R/W) control timing, row address strobe (RAS) timing, column address strobe (CAS) timing of the memory modules and other parameters can be predefined and implemented in the memory controller circuitry or defined by physical straps on the system board that are read and programmed into the memory controller. Thus, although the memory is capable of running at different parameters, these computing systems limit memory operational performance to the predefined parameters. To take advantage of new memory technologies, users must often purchase new computing systems. Further, computing system manufacturers must redesign or rework existing designs and system boards to take advantage of better performing memory technologies.

Newer computing system devices, for example, memory controllers, are programmable to operate at a variety of operational speeds and parameters. Often, BIOS programs or configure the parameters of these devices and memory controllers upon system boot to predefined parameters. However, upgrading the computing system to take advantage of newer memory technologies is often difficult because a BIOS revision is often needed. Additionally, having a BIOS program support multiple memory technologies to provide optimum performance adds complexity. Because different memory modules can have different operating envelopes, system manufacturers often limit system performance to the highest available performance of the slowest supported memory technology. Alternatively, system manufacturers can limit the use of memory to only one memory technology causing possible system disadvantages when newer or cheaper memory technologies become available. BIOS revisions are difficult and often include patching the BIOS code or completely reprogramming BIOS non-volatile memory. Even though programmability of these devices is available, computing system vendors often limit the use of memory technology or run at less than optimum performance.

SUMMARY

Accordingly, in one embodiment, a technique for initializing a memory controller of a plurality of memory modules for optimum system performance is presented. A plurality of optimum sets of operational parameters that are supported by the memory controller and the plurality of memory modules are determined. A plurality of benchmark calculations using the plurality of optimum sets of operational parameters produces a plurality of benchmark numbers. The memory controller is configured with the one of the plurality of optimum sets of operational parameters that produces the best of the plurality of benchmark numbers.

The benchmark calculations can be based on a variety of conditions, for example, burst length or the minimum time to read a random row of memory.

Additionally, the benchmark calculations can be weighted in favor of frequency.

In one embodiment, determining the plurality of optimum sets of operational parameters includes selecting a cycle time/CAS latency parameter pair, and determining if the memory controller and each of the plurality of memory modules supports the cycle time/CAS latency parameter pair. If any of the plurality of memory modules or the memory controller does not support the cycle time/CAS latency parameter pair, another cycle time/CAS latency parameter pair selected and the determining and the selecting is repeated until a supported cycle time/CAS latency parameter pair are found.

In one embodiment, selecting the cycle time/CAS latency parameter pair includes selecting a cycle time in order of lowest cycle time to highest cycle time and a CAS latency associated to the cycle time.

In another embodiment, selecting the cycle time/CAS latency parameter pair includes selecting a CAS latency in order of lowest CAS latency to highest CAS latency and a cycle time associated to the CAS latency associated.

In another embodiment, selecting the cycle time/CAS latency parameter pair includes selecting a cycle time and a CAS latency from a set of parameters supported by the memory controller.

In another embodiment, selecting the cycle time/CAS latency parameter pair includes selecting a cycle time and a CAS latency from a set of parameters supported by one of the plurality of memory modules.

In another embodiment, selecting the cycle time/CAS latency parameter pair includes selecting a cycle time and a CAS latency from a set including all possible parameters that could be programmed into one of the plurality of memory modules according to a memory information encoding.

In another embodiment, selecting the cycle time/CAS latency parameter pair includes selecting a cycle time and a CAS latency from a set of parameters supported by a majority of memory manufacturers.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 8A–8G illustrate exemplary code for configuration of a memory controller to optimum memory performance according to embodiments of the present invention.

The use of the same reference symbols in different drawings indicates similar or identical items.

DESCRIPTION OF THE PREFERRED EMBODIMENT(S)

According to the present invention, a BIOS algorithm chooses a unique combination of memory parameters from among an operating envelope supported by multiple memory modules and the capabilities of the memory controller. The unique combination chosen provides overall best performance taking into account computing system features and application characteristics.

Figure 1A:
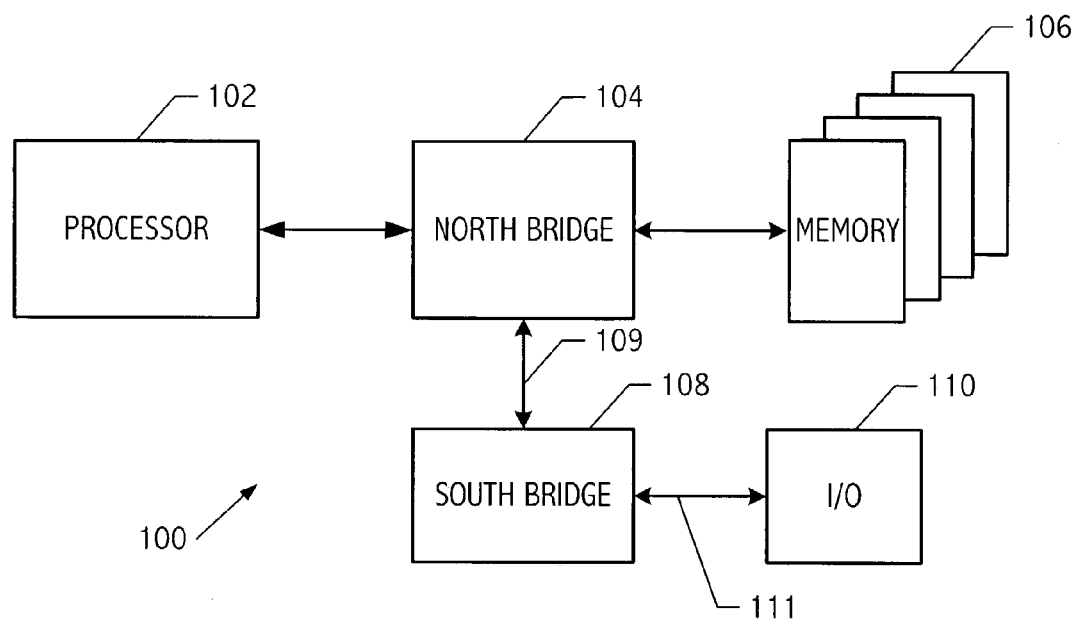
FIGS. 1A–1B illustrate exemplary computing system architectures utilized by an embodiment of the present invention.
Figure 1B:
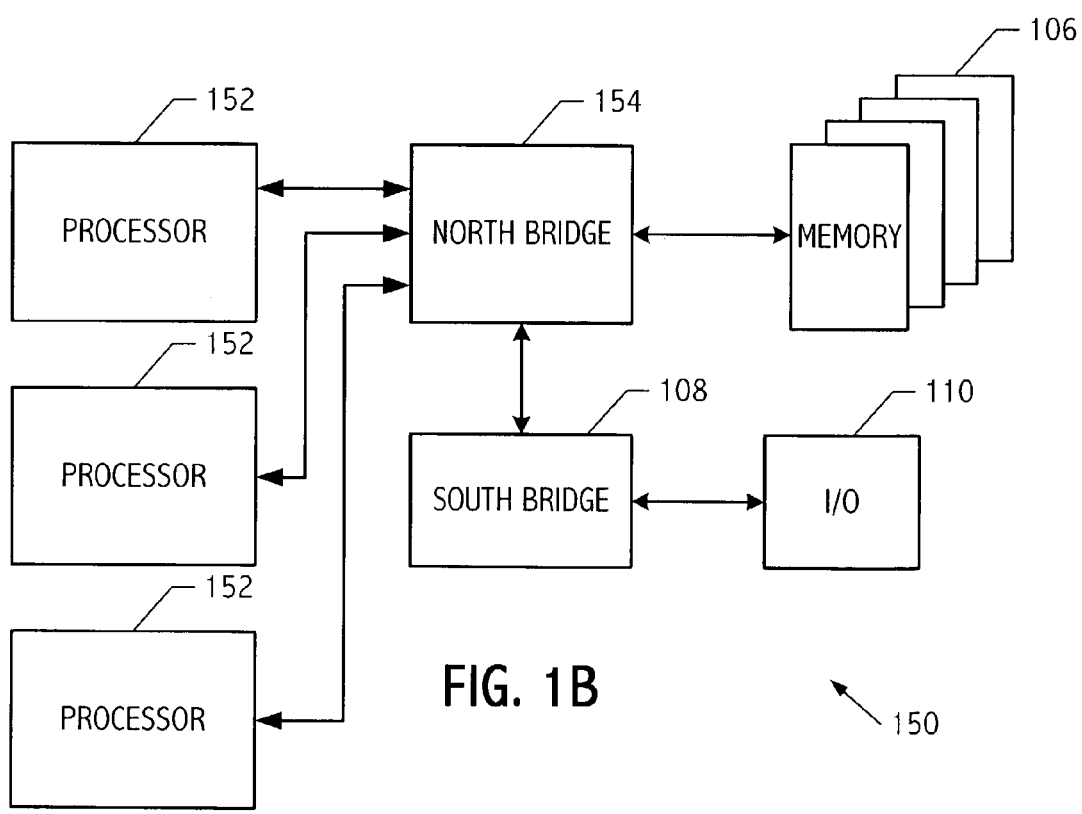

FIGS. 1A–1B illustrate exemplary computing system architectures utilized by an embodiment of the present invention. FIG. 1A illustrates an exemplary single processor computing system architecture 100. Processor 102 can be any type of processor with any architecture, for example, a single scalar, a superscalar or a VLIW processor. As illustrated, processor 102 communicates through north bridge 104 to memory array 106. North bridge 104 includes a memory controller and one or more bridges to other devices. North bridge 104 communicates with one or more south bridges 108 on a standard bus 109, for example, a peripheral component interconnect (PCI) bus. South bridge 108 communicates to one or more input/output (I/O) devices 110 on another standard bus 111, for example, an ISA bus. Additional devices (not shown) can be attached to standard buses 109 and 111.

FIG. 1B illustrates an exemplary multiprocessor computing system architecture 150. Architecture 150 is similar to architecture 100, except that multiple processors 152 communicate through a north bridge 154. Multiple processors 152 can share a common bus (not shown) to north bridge 154 or have individual communication paths as shown. Multiple processors 152 access memory array 106 through a memory controller in north bridge 154.

Figure 4:
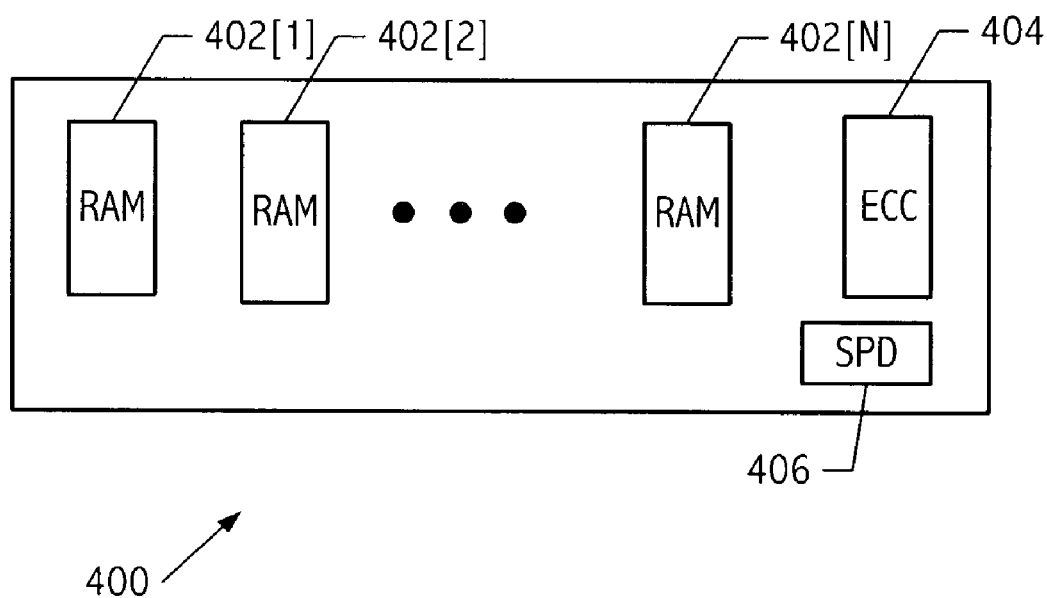
FIG. 4 illustrates an exemplary DIMM (dual inline memory module) utilized by an embodiment of the present invention.

Memory array 106 can consist of several memory slots, populated or unpopulated, for the addition or replacement of memory modules. North bridges 104 and 154 can be programmed to interface to a variety of memory modules. As illustrated, the interface to memory array 106 is shared amongst the memory modules. Thus, if differing memory modules are populated, north bridges 104 and 154 must be programmed to parameters that allow each memory module to operate correctly. An exemplary memory module is illustrated in FIG. 4. Prior art BIOS programs configure north bridges 104 and 154 according to system predefined memory parameters. While this reduces the overall complexity of the BIOS, using predefined memory parameters limits overall system performance, reduces flexibility for system upgrades and eliminates the ability to provide support for multiple platforms.

Figure 2:
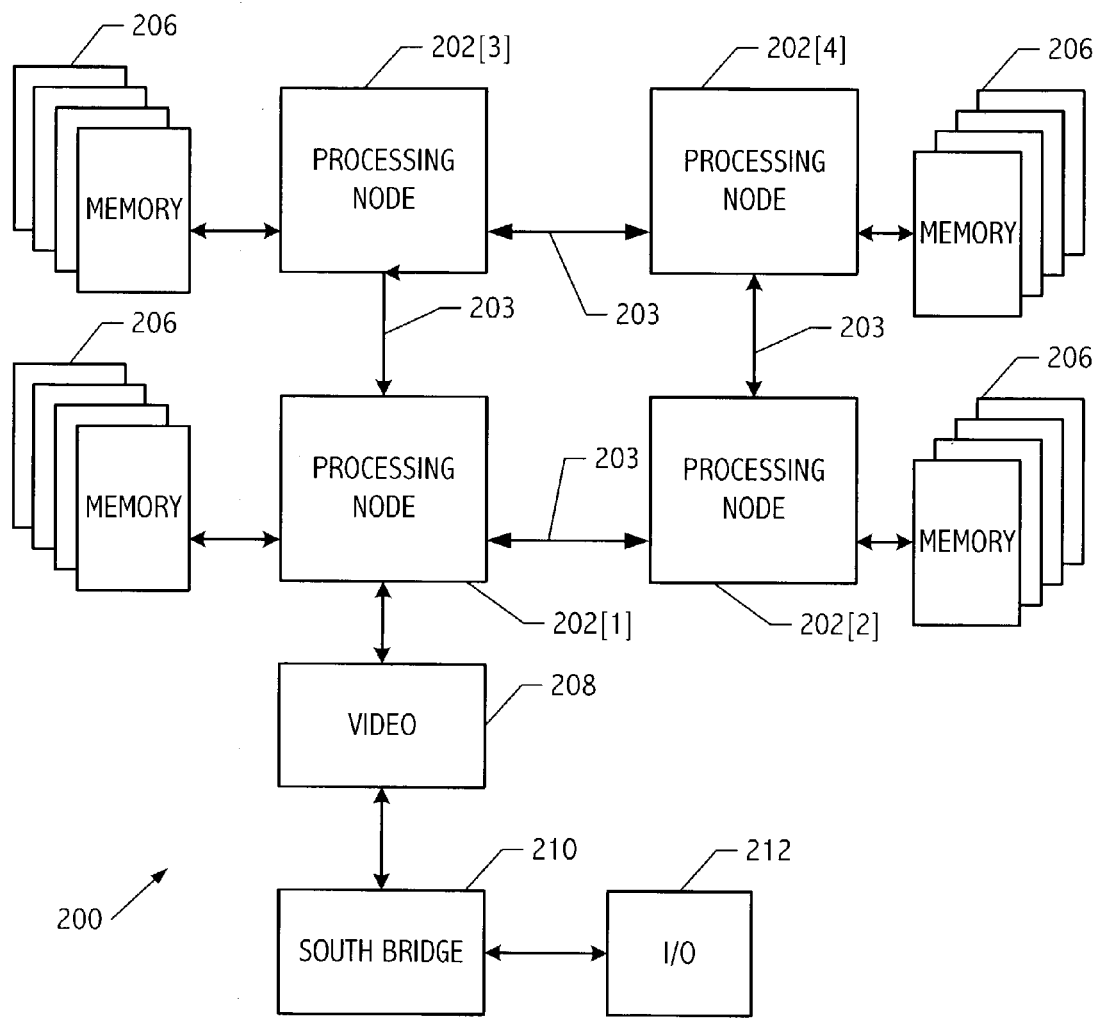
FIG. 2 illustrates an exemplary system architecture utilized by an embodiment of the present invention.

FIG. 2 illustrates an exemplary system architecture 200 utilized by an embodiment of the present invention. System 200 is a multiprocessor system with multiple processing nodes 202[1:4] that communicate with each other via links 203. Each of processing nodes 202 includes, for example, a processor, a memory controller and link interface circuitry. Links 203 can be dual point to point links according to, for example, a split-transaction bus protocol such as the HyperTransport™ (HT) protocol. Links 203 can include a downstream data flow and an upstream data flow. Link signals typically include link traffic such as clock, control, command, address and data information and link sideband signals that qualify and synchronize the traffic flowing between devices. Each memory controller of processing nodes 202[1:4] communicates to a memory array 206[1:4], respectively. The processing nodes 202 and memory arrays 206 are in a "coherent" portion of the system, where all memory transactions are coherent.

A video device 208 can be coupled to one of the processing nodes 202 via another HT link. Video device 208 can be coupled to a south bridge 210 via another HT link. One or more I/O devices 212 can be coupled to south bridge 210. Video device 208, south bridge 210 and I/O devices 212 are in a "non-coherent" portion of the system.

Each memory array 206 can consist of several memory slots, populated or unpopulated, for the addition or replacement of memory modules. Each memory slot can provide, for example, 512 Megabytes (Mbytes) of storage capability. System 200 is typically a server system and can have large amounts of memory, for example 32 Gigabytes (GBytes) of storage capability. The memory controller of each processing node 202 can be programmed differently, but must be programmed to interface to the local variety of memory modules coupled to the associated processing node 202.

Limiting operational performance of the memory is undesirable. Additionally, limiting the capability of system manufacturers to use different memory technology, even within the same system, is also undesirable. However, a BIOS program must be intelligent and flexible to provide optimum memory performance when multiple memory modules with different operating envelopes are populated in a single memory array controlled by a memory controller that also supports multiple operational parameters.

System 200 can be more complex than shown, for example, additional processing nodes 202 can make up the coherent portion of the system. Additionally, although processing nodes 202 are illustrated in a "ladder architecture," processing nodes 202 can be interconnected in a variety of ways and can have more complex couplings. For example, processing node 202[3] can be connected directly to processing node 202[2] via an additional HT link.

Figure 3:
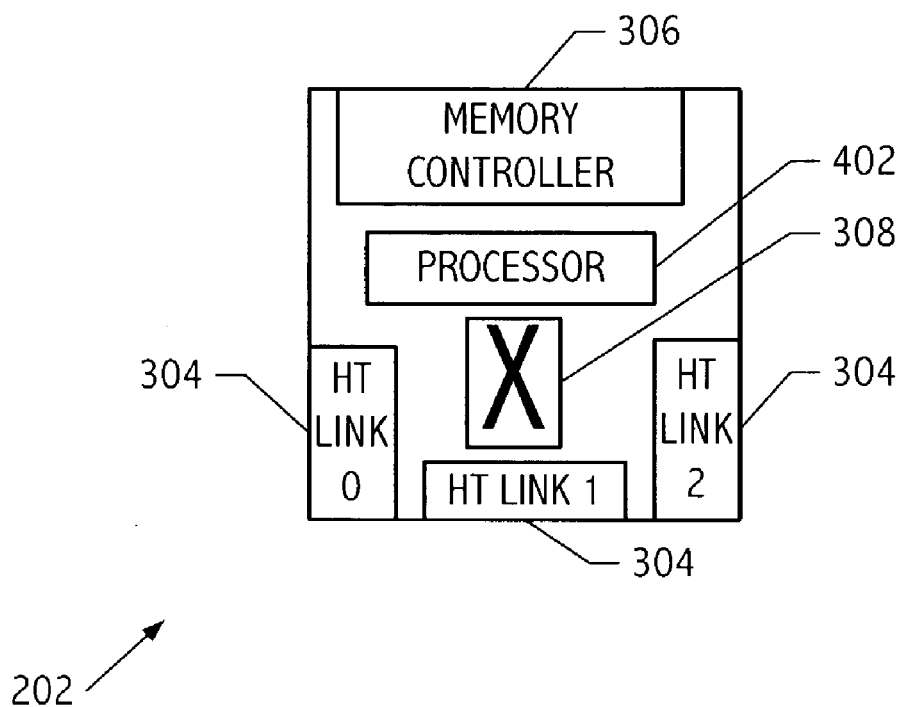
FIG. 3 illustrates an exemplary processing node utilized by an embodiment of the present invention.

FIG. 3 illustrates an exemplary processing node 202 utilized by an embodiment of the present invention. As illustrated, processing node 202 includes a processor 302, multiple HT link interfaces 304, and a memory controller 306. A crossbar 308 transfers requests, responses and broadcast messages to processor 302 and/or the appropriate HT link interface(s) 304. Transfer of the requests, responses and broadcast messages is directed by multiple configuration routing tables located in each processing node 202 that must be configured by BIOS. Additionally, memory controller 306 contains multiple configuration registers that control the operational parameters of the interfaced to memory array 206 that must be configured by BIOS. For example, BIOS can configure such memory controller parameters as DIMM bank configuration (the size of the bank and relative location of the addressed bank within the system address space, device width, and the like), memory controller configuration (data width, cycle delays between signal transitions, timing constants, and the like), and memory controller timing configurations (such as speed of the interface to the DIMMs). Memory controller timing configurations can also include such parameters as row precharge time, minimum row address strobe (RAS) active time, active to active delay (RAS to RAS of different banks), RAS active to column address strobe (CAS) read/write delay to the same bank, row refresh cycle time, row cycle time, write recovery, write to read delay, and CAS latency (CAS to read data valid).

FIG. 4 illustrates an exemplary DIMM (dual inline memory module) 400 utilized by an embodiment of the present invention. Several DIMMs, typically eight, can make up a memory array, for example, memory array 106 or 206. DIMM 400 is a printed circuit board and contains multiple random access memory (RAM) integrated circuits or chips 402[1:N], for example, DDR (double data rate) memory chips. Additionally, DIMM 400 can have an ECC (error correction code) chip 404. ECC chip 404 stores error correction codes that allow memory errors to be found and corrected. Additionally, DIMM 400 can have an SPD (serial presence detect) chip 406. SPD chip 406 contains read only information specifying an operational range of DIMM 400 and other information similar to what one would find in a data sheet. For example, SPD chip 406 identifies memory storage capacity of DIMM 400, operating parameters such as minimum cycle times, CAS latency, and the like.

In general, a system can contain randomly populated DIMMs whose individual operating envelopes are different but overlap. The intersection of all the envelopes, where they overlap, is considered the real operating range. BIOS must program the memory controller to operate within this real operating region in order to satisfy the requirements of all the disparate DIMMs. Furthermore, within this real operating range, several solutions can exist. BIOS must choose, arbitrarily if required, only one of the available solutions. The solution which yields the best performance is desired. Performance can be any criteria, chosen by the system and the BIOS designer. BIOS must find the operating range of a system of disparate DIMM modules and within the real operating range, determine which one solution provides the optimal performance.

An exemplary standardized SPD information encoding is described in JEDEC Standard JESD79, Double Data Rate (DDR) SDRAM specification. Although the present invention is described in relation to this encoding, other encodings of operational parameters can be utilized in accordance with the present invention.

Figure 5:
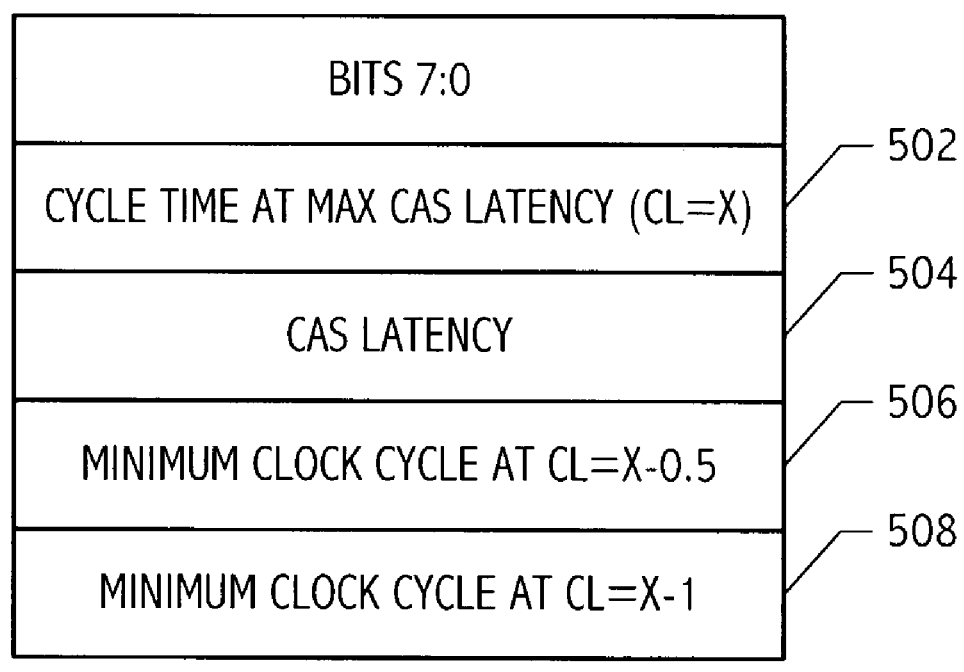
FIG. 5 illustrates an exemplary portion of a memory information encoding utilized by an embodiment of the present invention.

FIG. 5 illustrates an exemplary portion of memory information encoding 500 utilized by the present invention. Note that only a portion of possible memory information parameters are included. For example, SPD information encoding as described in JEDEC Standard JESD79 is much larger and contains a much more detailed description of the DIMM. Note that CAS latency is definitionally related to cycle time.

Register 502 is the cycle time of the DIMM. This byte defines the minimum cycle time for the module at the highest CAS latency (CL), that is, CL=X, defined in register 504. Register 502 is split into two nibbles: the higher order nibble (bits 4–7) designates the cycle time to a granularity of 1ns; the value presented by the lower order nibble (bits 0–3) has a granularity of 0.1 ns and is added to the value designated by the higher nibble. For example, if bits 7:4 are 0111 (7 ns) and bits 3:0 are 0101 (0.5 ns) then the total cycle time is 7.5 ns.

Register 504 is the CAS latency. This byte describes which of the programmable CAS latencies are acceptable for the module. If the bit is "1", then that CAS latency is supported on the module; if the bit is "0", then that CAS latency is not supported by the module. Bit 0 represents CL=1 cycle, Bit 1 represents CL=1.5 cycles, and so on up to Bit 6 represents CL=4 cycles. (Bit 7 is not used). Multiple bits in register 504 can be set.

Register 506 is the minimum clock cycle time at reduced CL=X−0.5. The highest CAS latency identified in register 504 is X and the timing values associated with CAS latency 'X' are found in register 502. For example, if register 504 denotes CAS latencies of 1.5 to 2.5, then X is 2.5 and X−0.5 is 2. Register 506 then denotes the minimum cycle time at CAS latency 2. Register 506 is broken into two nibbles: the higher order nibble (bits 4–7) designate the cycle time to a granularity of 1 ns; the value presented by the lower order nibble (bits 0–3) has a granularity of 0.1 ns and is added to the value designated by the higher nibble.

Register 508 is the minimum clock cycle time at CL=X−1. The highest CAS latency identified in register 504 is X. For example, if register 504 denotes CAS latencies of 1.5 to 2.5, then X is 2.5 and X−1 is 1.5. Register 508 then denotes the minimum cycle time at CAS latency 1.5. Register 508 is broken into two nibbles: the higher order nibble (bits 4–7) designates the cycle time to a granularity of 1 ns; the value presented by the lower order nibble (bits 0–3) has a granularity of ins and is added to the value designated by the higher order nibble.

Figure 6:
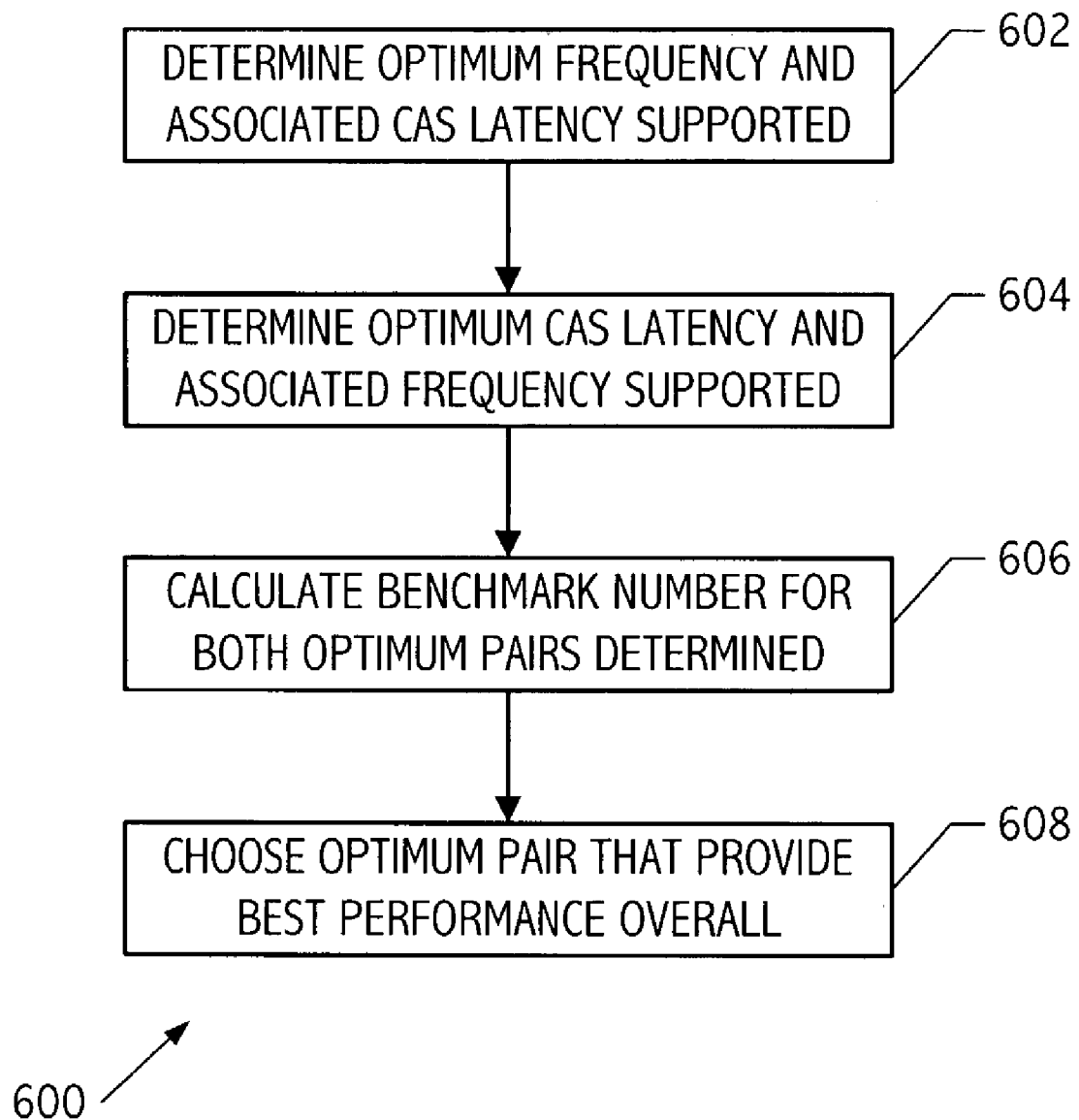
FIG. 6 illustrates an exemplary flow diagram for configuration of a memory controller to optimum memory performance according to an embodiment of the present invention.
Figure 7A:
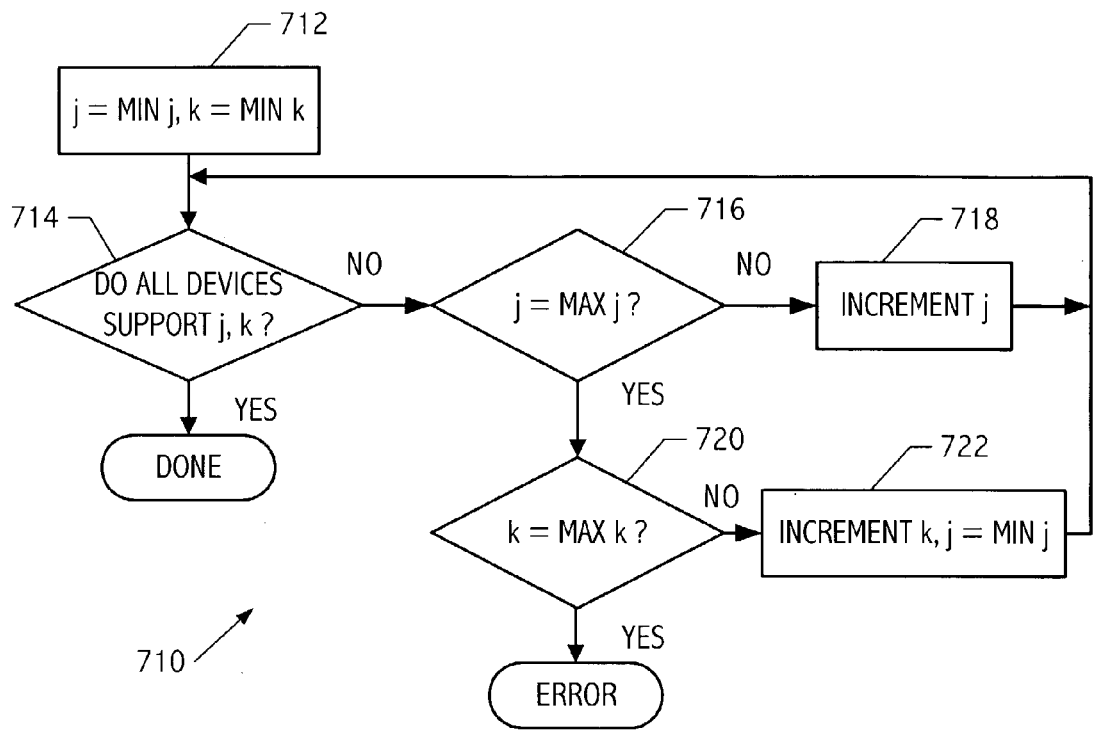
FIGS. 7A–7C illustrate exemplary flow diagrams for determination of optimum performance pairs according to embodiments of the present invention.
Figure 7B:
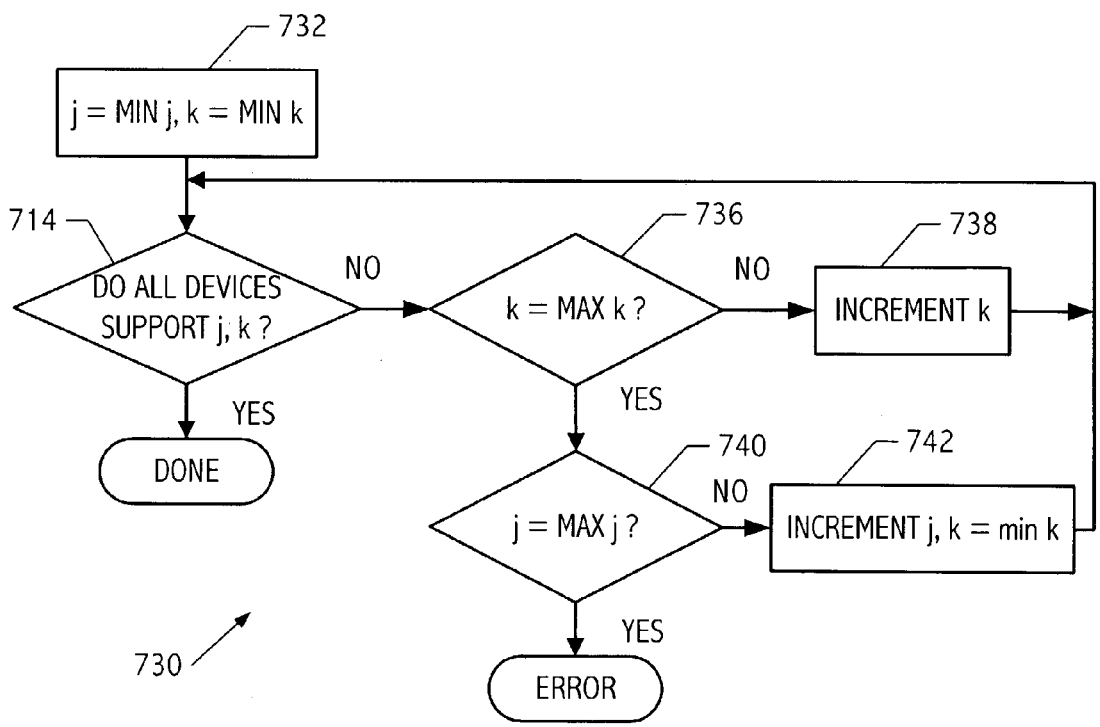
Figure 7C:
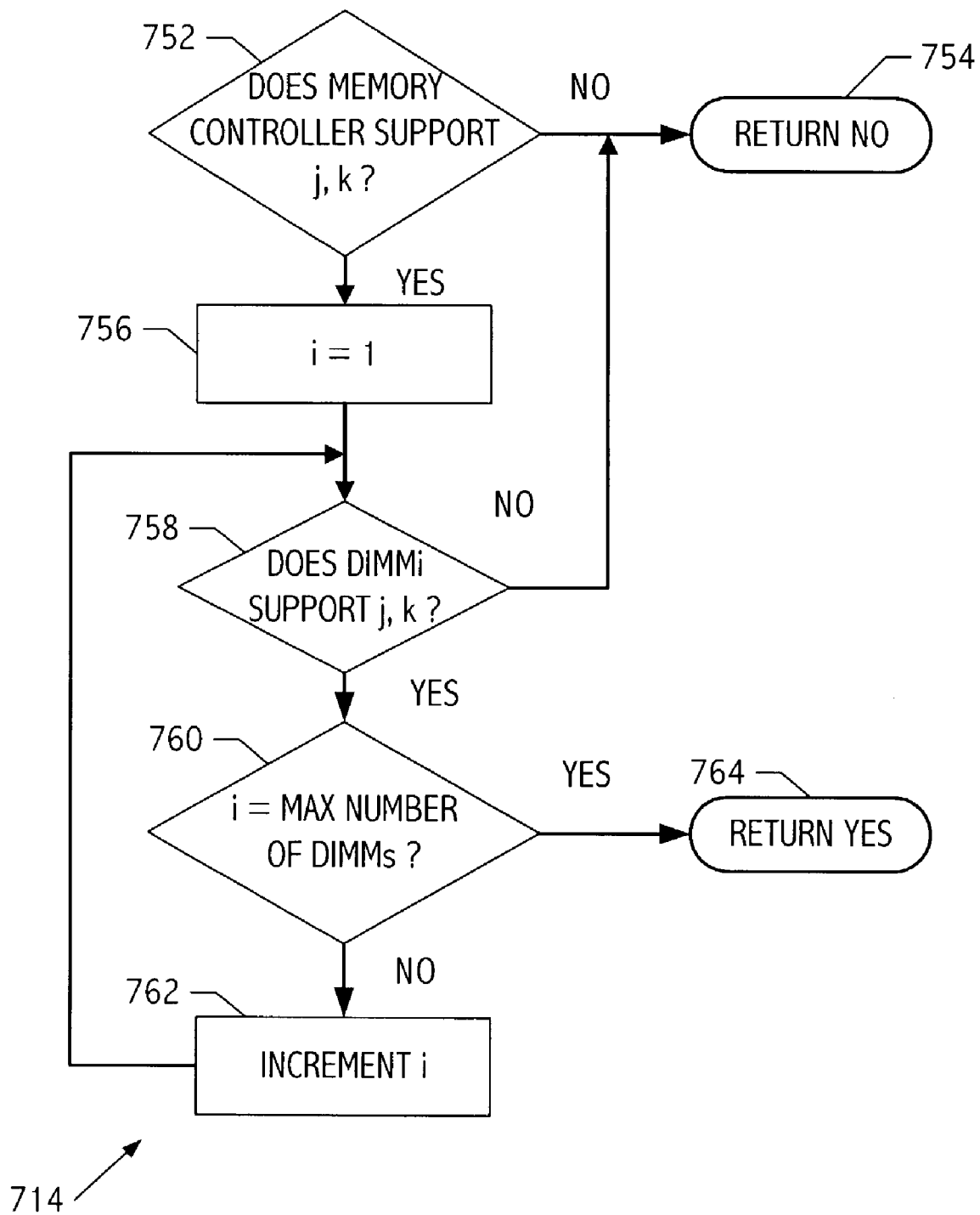

FIG. 6 illustrates a flow diagram for determining optimum system performance according to an embodiment of the present invention. The optimum frequency and associated CAS latency supported is determined, step 602. The optimum CAS latency and associated frequency supported is determined, step 604. An exemplary procedure for the determinations made in steps 602 and 604 is illustrated in FIGS. 7A–7C. A benchmark number is calculated for both optimum pairs, step 606. The optimum pair that provides the best benchmark number is chosen as the system operational parameters, step 608.

As explained in reference to FIG. 5, frequency is specified as a minimum cycle time in terms of nanoseconds and tenths of nanoseconds. CAS latency is specified as a number of cycles. Thus, the frequency and CAS latency are related, however, not proportionately. For example, a DIMM module can have a minimum cycle time of 10 nanoseconds (ns), 15 ns, 20 ns and a CAS latency of 3, 2, and 2 cycles, respectively. Here, the optimum frequency and associated CAS latency pair is 10 ns and 3 cycles, but the associated frequency and optimum CAS latency pair is 15 ns and 2 cycles. Thus, BIOS must determine which of these pairs provide optimal performance for the system overall.

Because different applications access memory differently, the optimum pairs can provide different results based on which applications are run. Although computer systems run many applications, in general an approximation can be made. For example, a server can expect many random accesses from desktop applications such as a word processing application, and thus the lower the CAS latency the better. Alternatively, gaming, media streaming or graphics applications that perform many sequential or bursty accesses perform better with the optimal frequency.

A benchmark calculation is performed for both optimum pairs, step 606. The benchmark can be a function of frequency and CAS latency. The benchmark function produces a benchmark number—here, the lowest of which produces the best system performance.

Below is an exemplary benchmark calculation:

$$B(j,k)=k*(\beta+j)$$

where j is CAS latency in cycles, k is cycle time in nanoseconds and β is a constant, for example, based on burst length and module type. Here, B is based on the minimum time to read a random row, assuming that the memory controller is always as fast as or faster than the memory devices without adding wait states.

Total read time can be calculated as (Trp+Trcd+Tcl+Tcyc*B.L./2) for unbuffered DIMMs and (Trp+Trcd+Tcl+Tcyc+Tcyc*B.L./2) for registered DIMMs where Trp is the time to close currently open row, Trcd is the latency from activate (RAS) to a read or write command, and Tcl is the latency from a read command (CAS) to start strobing in data from DIMMs. If operating on registered DIMMs, an extra clock cycle (Tcyc), is inserted as part of the CAS latency. Tcyc is the clock period, also referred to as cycle time. B.L., or burst length, is the number of data strobes for any read and can be, for example, 2, 4 or 8. Note that here data is double strobed (2 per clock). The equation can be simplified if the designer assumes that the memory controller can hide some of the latency with internal page buffers and that most computer architectures are tuned for prefetching to cache, thus, the full latency is almost never practiced. In other words, only a small percentage of reads are totally random and instead are typically pipelined into the internal page buffers. Another assumption is that Trp and Trcd are not functionally dependent on each other, as cycle time and CAS latency are dependent. Thus, because the benchmark calculation is to find a best cycle time and CAS latency pair, the read time calculations can be reduced, ignoring the other terms and emphasizing cycle time and CAS latency. Thus, for the benchmark calculation, benchmark read time can be estimated as Tcl+Tcyc*B.L./2. Tcl is CAS latency times Tcyc. Thus, the benchmark read time can be estimated as ((CAS latency)*Tcyc+Tcyc*B.L./2) for unbuffered DIMMs and as ((CAS latency)*Tcyc+Tcyc+Tcyc*B.L./2) or ((CAS latency)*Tcyc+Tcyc*(1+B.L./2)) for registered DIMMs. To further simplify the formula, β is defined as (B.L./2) for unbuffered DIMMs and as (1+B.L./2) for registered DIMMs. Thus, the benchmark read time is ((CAS latency)*Tcyc+Tcyc*β. Tcyc can be factored out so that estimated read time is Tcyc*((CAS latency)+β).

The benchmark calculation utilized can vary based on system characteristics. For example, the benchmark calculation can simply be equal to k, or k*k*(β+j) if the system designer wants to favor bursty applications and thus favor frequency.

FIGS. 7A–7C illustrate exemplary flow diagrams for determination of optimum performance pairs according to embodiments of the present invention. Referring to FIG. 7A, flow 710, a CAS latency and frequency pair are determined based on the optimum frequency and associated CAS latency supported. CAS latency 0) is set to the minimum number of cycles and cycle time (k) is set to the minimum cycle time (therefore, the maximum frequency), step 712. A determination is made whether all devices (all DIMMs and the memory controller) support this j, k pair, step 714. If not, a determination is made whether j is the maximum j (therefore the maximum CAS latency for this frequency), step 716. If not, j is incremented to the next j, step 718. If j is the maximum j, a determination is made whether k is the maximum k, step 720. If so, an error is reported indicating that there are no valid j, k pairs supported by all devices. If k is not the maximum k, k is incremented to the next k and j is set back to the minimum CAS latency, step 722. Once a j, k pair is found that is supported by all devices, flow 710 is complete and the optimum frequency and associated CAS latency supported has been found.

Referring to FIG. 7B, flow 730, a CAS latency and frequency pair are determined based on the optimum CAS latency and associated frequency supported. CAS latency (j) is set to the minimum number of cycles and cycle time (k) is set to the minimum cycle time (therefore, the maximum frequency), step 732. A determination is made whether all devices (all DIMMs and the memory controller) support this j, k pair, step 714. Note that this is a similar determination as made in flow 710 and is further described in FIG. 7C. If not, a determination is made whether k is the maximum k (therefore the maximum cycle time for this CAS latency), step 736. If not, k is incremented to the next k, step 738. If k is the maximum k, a determination is made whether j is the maximum j, step 740. If so, an error is reported indicating that there are no valid j, k pairs supported by all devices. If j is not the maximum, j is incremented to the next j and k is set back to the minimum cycle time, step 742. Once a j, k pair is found that is supported by all devices, flow 730 is complete and the optimum CAS latency and associated frequency supported has been found.

FIG. 7C illustrates a flow diagram 714 for determination if all devices support the given j, k pair. A determination is made whether the memory controller supports the given j, k, step 752. If not, the flow returns a no, step 754. If so, i (representing the current DIMM device number) is set to 1, step 756. A determination is made whether the DIMMi supports the given j, k, step 758. If not, the flow returns a no, step 754. If so, a determination is made whether i is equal to the maximum number of DIMMs, step 760. If not, i is incremented, step 762 and the determination of whether the next DIMM supports j, k, step 758. If i is the maximum number of DIMMs, then all DIMMs and the memory controller support the given j, k and the flow returns a yes, step 764.

The minimum j and k and the next j and k can be defined in a variety of ways. For example, the minimums can be the minimum supported by the register definitions in the DIMMs (for example, the cycle time 0.1 ns and CAS latency 1 cycle) and the next values incremented based on the register definition granularity. Alternatively, the minimum and the next incremental values can be determined based on the support by a particular device, for example, the memory controller or the first read DIMM. Here, the BIOS would determine the support of the device, for example, by reading the first DIMM, and step through the flows as such. Alternatively, the minimum value and the next values can be defined by the most commonly supported parameters by DIMM manufacturers and system architectures.

In one embodiment, a memory controller can supply any CAS latencies for its supported frequencies. Additionally, each DIMM can support slower frequencies than its maximum frequency, but not a CAS latency less than its minimum CAS latency for the associated frequency.

In an alternate embodiment, BIOS determines the best cycle time or CAS latency pair and uses that pair as the optimal performance pair without performing a benchmark calculation.

FIGS. 8A–8F illustrate exemplary code for configuration of a memory controller to optimum memory performance according to embodiments of the present invention. FIG. 8A illustrates an algorithm to find the best cycle time and CAS latency of the given DIMMs. FIG. 8B illustrates an alternate embodiment of an algorithm to find the best cycle time and CAS latency of the given DIMMs. FIG. 8C illustrates an algorithm to find the best CAS latency and associated cycle time of the given DIMMs. FIGS. 8D–8E illustrate an algorithm to find the best CAS latency and cycle time of the given DIMMs as expressed mathematically by a supplied synthetic benchmark. FIG. 8F illustrates a synthetic benchmark formula that computes a number that relates to a real world performance. FIG. 8G illustrates an alternate synthetic benchmark formula, a routine to determine if a DIMM slot is populated, a routine to determine if a given DIMM supports the given j,k pair, and a routine to determine if the memory controller supports the given j, k pair.

Flows 600, 710, 714 and 730 are utilized for configuration of a memory controller to provide optimum performance according to some embodiments of the invention. It is appreciated that operations discussed herein may include directly entered commands by a computer system user, but the preferred embodiment includes steps executed by software modules. The functionality of steps referred to herein may correspond to the functionality of modules or portions of modules. In addition to software modules, the above flows or portions of flows can be implemented as application instructions or menu items.

The operations referred to herein may be modules or portions of modules (e.g., software, firmware, or hardware modules). For example, the software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention.

Thus, the flows described herein, the operations thereof and modules therefore may be executed on a computer system configured to execute the operations of the flows and/or may be executed from computer-readable media. The flows may be embodied in a machine-readable and/or computer-readable medium for configuring a computer system to execute the flows. Thus, the software modules may be stored within and/or transmitted to a computer system memory to configure the computer system to perform the functions of the module.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method for initializing a memory controller of a plurality of memory modules comprising:
    determining a plurality of optimum sets of operational parameters that are supported by the memory controller and the plurality of memory modules;
    performing a plurality of benchmark calculations using the plurality of optimum sets of operational parameters producing a plurality of benchmark numbers; and
    programming the memory controller with the one of the plurality of optimum sets of operational parameters that produces the best of the plurality of benchmark numbers;

wherein the determining the plurality of optimum sets of operational parameters comprises:
selecting a cycle time/CAS latency parameter pair; and
determining if the memory controller and each of the plurality of memory modules supports the cycle time/CAS latency parameter pair;
if any of the plurality of memory modules or the memory controller does not support the cycle time/CAS latency parameter pair, selecting another cycle time/CAS latency parameter pair and repeating the determining and the selecting until a supported cycle time/CAS latency parameter pair are found.

2. The method, as recited in claim 1, wherein the selecting the cycle time/CAS latency parameter pair comprises:
selecting a cycle time in order of lowest cycle time to highest cycle time; and
selecting a CAS latency associated to the cycle time.

3. The method, as recited in claim 1, wherein the selecting the cycle time/CAS latency parameter pair comprises:
selecting a CAS latency in order of lowest CAS latency to highest CAS latency; and
selecting a cycle time associated to the CAS latency associated.

4. The method, as recited in claim 1, wherein the selecting the cycle time/CAS latency parameter pair comprises:
selecting a cycle time and a CAS latency from a set of parameters supported by the memory controller.

5. The method, as recited in claim 1, wherein the selecting the cycle time/CAS latency parameter pair comprises:
selecting a cycle time and a CAS latency from a set of parameters supported by one of the plurality of memory modules.

6. The method, as recited in claim 1, wherein the selecting the cycle time/CAS latency parameter pair comprises:
selecting a cycle time and a CAS latency from a set including all possible parameters that could be programmed into one of the plurality of memory modules according to a memory information encoding.

7. The method, as recited in claim 1, wherein the selecting the cycle time/CAS latency parameter pair comprises:
selecting a cycle time and a CAS latency from a set of parameters supported by a majority of memory manufacturers.

8. The method, as recited in claim 1, wherein the memory controller can supply a plurality of CAS latencies for a given frequency.

9. The method, as recited in claim 1, wherein one of the plurality of memory modules can support slower frequencies than a maximum supported frequency.

10. The method, as recited in claim 1, wherein the plurality of benchmark calculations is based on a minimum time to read a random row of memory.

11. The method, as recited in claim 1, wherein the performing the plurality of benchmark calculations comprises:
calculating the benchmark numbers utilizing a formula that is weighted in favor of frequency.

12. A method for initializing a memory controller of a plurality of memory modules comprising:
determining a plurality of optimum sets of operational parameters that are supported by the memory controller and the plurality of memory modules;
performing a plurality of benchmark calculations using the plurality of optimum sets of operational parameters producing a plurality of benchmark numbers; and
programming the memory controller with the one of the plurality of optimum sets of operational parameters that produces the best of the plurality of benchmark numbers;
wherein the performing the plurality of benchmark calculations comprises:
calculating the benchmark numbers utilizing a formula that accounts for a burst length supported by the memory controller.

13. The method, as recited in claim 12 wherein the performing the plurality of benchmark calculations comprises:
calculating the benchmark numbers utilizing a formula that is weighted in favor of bursty applications.

14. A computer program product for initializing a memory controller of a plurality of memory modules comprising:
a set of software instructions stored on computer readable media, the set of software instructions configured to:
determine a plurality of optimum sets of operational parameters that are supported by the memory controller and the plurality of memory modules;
perform a plurality of benchmark calculations using the plurality of optimum sets of operational parameters producing a plurality of benchmark numbers; and
program the memory controller with the one of the plurality of optimum sets of operational parameters that produces the best of the plurality of benchmark numbers;
wherein to determine the plurality of optimum sets of operational parameters the set of software instructions is configured to:
select a cycle time/CAS latency parameter pair; and
determine if the memory controller and each of the plurality of memory modules supports the cycle time/CAS latency parameter pair;
if any of the plurality of memory modules or the memory controller does not support the cycle time/CAS latency parameter pair, select another cycle time/CAS latency parameter pair and repeat determining and selecting until a supported cycle time/CAS latency parameter pair are found.

15. The computer program product, as recited in claim 14, wherein to select the cycle time/CAS latency parameter pair the set of software instructions is configured to:
select a cycle time in order of lowest cycle time to highest cycle time; and
select a CAS latency associated to the cycle time.

16. The computer program product, as recited in claim 14, wherein to select the cycle time/CAS latency parameter pair the set of software instructions is configured to:
select a CAS latency in order of lowest CAS latency to highest CAS latency; and
select a cycle time associated to the CAS latency.

17. The computer program product, as recited in claim 14, wherein to select the cycle time/CAS latency parameter pair the set of software instructions is configured to:
select a cycle time and a CAS latency from a set of parameters supported by the memory controller.

18. The computer program product, as recited in claim 14, wherein to select the cycle time/CAS latency parameter pair the set of software instructions is configured to:
select a cycle time and a CAS latency from a set of parameters supported by one of the plurality of memory modules.

19. The computer program product, as recited in claim 14, wherein to select the cycle time/CAS latency parameter pair the set of software instructions is configured to:

select a cycle time and a CAS latency from a set including all possible parameters that could be programmed into one of the plurality of memory modules according to a memory information encoding.

20. The computer program product, as recited in claim 14, wherein to select the cycle time/CAS latency parameter pair the set of software instructions is configured to:
select a cycle time and a CAS latency from a set of parameters supported by a majority of memory manufacturers.

21. The computer program product, as recited in claim 14, wherein the memory controller can supply a plurality of CAS latencies for a given frequency.

22. The computer program product, as recited in claim 14, wherein one of the plurality of memory modules can support slower frequencies than a maximum supported frequency.

23. The computer program product, as recited in claim 14, wherein the plurality of benchmark calculations is based on a minimum time to read a random row of memory.

24. The computer program product, as recited in claim 14, wherein to perform the plurality of benchmark calculations the set of software instructions is configured to:
calculate the benchmark numbers utilizing a formula that is weighted in favor of bursty applications.

25. The computer program product, as recited in claim 14, wherein to perform the plurality of benchmark calculations the set of software instructions is configured to:
calculate the benchmark numbers utilizing a formula that is weighted in favor of frequency.

26. A computer program product for initializing a memory controller of a plurality of memory modules comprising:
a set of software instructions stored on computer readable media, the set of software instructions configured to:
determine a plurality of optimum sets of operational parameters that are supported by the memory controller and the plurality of memory modules;
perform a plurality of benchmark calculations using the plurality of optimum sets of operational parameters producing a plurality of benchmark numbers; and
program the memory controller with the one of the plurality of optimum sets of operational parameters that produces the best of the plurality of benchmark numbers;
wherein to perform the plurality of benchmark calculations the set of software instructions is configured to:
calculate the benchmark numbers utilizing a formula that accounts for a burst length supported by the memory controller.

27. An apparatus for initializing a memory controller of a plurality of memory modules comprising:
means for determining a plurality of optimum sets of operational parameters that are supported by the memory controller and the plurality of memory modules;
means for performing a plurality of benchmark calculations using the plurality of optimum sets of operational parameters producing a plurality of benchmark numbers;
means for programming the memory controller with the one of the plurality of optimum sets of operational parameters that produces the best of the plurality of benchmark numbers;
wherein the means for determining the plurality of optimum sets of operational parameters comprises:
means for selecting a cycle time/CAS latency parameter pair; and
means for determining if the memory controller and each of the plurality of memory modules supports the cycle time/CAS latency parameter pair;
means for selecting another cycle time/CAS latency parameter pair and repeating the means for determining and the means for selecting until a supported cycle time/CAS latency parameter pair are found if any of the plurality of memory modules or the memory controller does not support the cycle time/CAS latency parameter pair.

28. The apparatus, as recited in claim 27 wherein the means for selecting the cycle time/CAS latency parameter pair comprises:
means for selecting a cycle time in order of lowest cycle time to highest cycle time; and
means for selecting a CAS latency associated to the cycle time.

29. The apparatus, as recited in claim 27, wherein the means for selecting the cycle time/CAS latency parameter pair comprises:
means for selecting a CAS latency in order of lowest CAS latency to highest CAS latency; and
means for selecting a cycle time associated to the CAS latency.

30. The apparatus, as recited in claim 27, wherein the means for selecting the cycle time/CAS latency parameter pair comprises:
means for selecting a cycle time and a CAS latency from a set of parameters supported by the memory controller.

31. The apparatus, as recited in claim 27, wherein the means for selecting the cycle time/CAS latency parameter pair comprises:
means for selecting a cycle time and a CAS latency from a set of parameters supported by one of the plurality of memory modules.

32. The apparatus, as recited in claim 27, wherein the means for selecting the cycle time/CAS latency parameter pair comprises:
means for selecting a cycle time and a CAS latency from a set including all possible parameters that could be programmed into one of the plurality of memory modules according to a memory information encoding.

33. The apparatus, as recited in claim 27, wherein the means for selecting the cycle time/CAS latency parameter pair comprises:
means for selecting a cycle time and a CAS latency from a set of parameters supported by a majority of memory manufacturers.

34. The apparatus, as recited in claim 27, wherein the memory controller can supply a plurality of CAS latencies for a given frequency.

35. The apparatus, as recited in claim 27, wherein one of the plurality of memory modules can support slower frequencies than a maximum supported frequency.

36. The apparatus, as recited in claim 27, wherein the plurality of benchmark calculations is based on a minimum time to read a random row of memory.

37. The apparatus, as recited in claim 27, wherein the means for performing the plurality of benchmark calculations comprises:
means for calculating the benchmark numbers utilizing a formula that accounts for a burst length supported by the memory controller.

38. The apparatus, as recited in claim 27, wherein the means for performing the plurality of benchmark calculations comprises:

means for calculating the benchmark numbers utilizing a formula that is weighted in favor of bursty applications.

39. The apparatus, as recited in claim 27, wherein the means for performing the plurality of benchmark calculations comprises:
means for calculating the benchmark numbers utilizing a formula that is weighted in favor of frequency.

40. A method for initializing a memory controller of a plurality of memory modules comprising:
performing at least one set of benchmark calculations for individual sets of operational parameters of a plurality of sets of operational parameters, the individual sets of operational parameters being supported by the memory controller and the plurality of memory modules; and
programming a memory controller with a first set of operational parameters of the individual sets of operational parameters, the first set providing at least one best benchmark number of the set of benchmark calculations;
wherein the individual sets of operational parameters include at least a set of operational parameters having a best value of a first parameter and at least a value of a second parameter associated with the best value of the first parameter and a set including a best value of the second parameter and at least a value of the first parameter associated with the best value of the second parameter.

41. The method, as recited in claim 40, wherein individual memory modules of the plurality of memory modules have different ranges of operating characteristics.

42. The method, as recited in claim 40, wherein the first and second parameters are CAS latency and cycle time, respectively.

43. The method, as recited in claim 40, wherein the plurality of benchmark calculations is based on at least a minimum time to read a random row of memory.

44. The method, as recited in claim 10, wherein the set of benchmark calculations is based on at least one of $k*(\beta+j)$ and $k*k*(\beta+j)$, where $\beta$ is a constant, k is cycle time, and j is CAS latency.

45. The method, as recited in claim 40, wherein the set of operational parameters include at least one of a memory module bank size, a relative location of an addressed bank within a system address space of the memory module, a device width of the memory module, a data width of the memory controller, cycle delays between transitions of the memory controller, timing constants of the memory controller, speed of an interface between the memory controller and the memory module, row precharge time of the memory module, minimum row address strobe (RAS) active time of the memory module, active to active delay of the memory module, RAS active to column address strobe (CAS) read/write delay to the same bank of the memory module, row refresh cycle time of the memory module, row cycle time of the memory module, write recovery of the memory module, write to read delay of the memory module, and CAS latency of the memory module.

46. A method for initializing a memory controller of a plurality of memory modules comprising:
performing at least one set of benchmark calculations for individual sets of operational parameters of a plurality of sets of operational parameters, the individual sets of operational parameters being supported by the memory controller and the plurality of memory modules;
programming a memory controller with a first set of operational parameters of the individual sets of operational parameters, the first set providing at least one best benchmark number of the set of benchmark calculations; and
wherein the set of benchmark calculations is based on at least a weighting in favor of bursty applications.

* * * * *

UNITED STATES PATENT AND TRADEMARK OFFICE
CERTIFICATE OF CORRECTION

PATENT NO. : 7,096,349 B1
APPLICATION NO. : 10/320085
DATED : August 22, 2006
INVENTOR(S) : Thomas H. Hamilton It is certified that error appears in the above-identified patent and that said Letters Patent is hereby corrected as shown below:

Col. 15, line 37, please replace "claim 10," with --claim 40,--

Signed and Sealed this

Twenty-eighth Day of November, 2006

JON W. DUDAS
*Director of the United States Patent and Trademark Office*